US012616098B2

(12) United States Patent (10) Patent No.: US 12,616,098 B2

Somarowthu et al. (45) Date of Patent: May 5, 2026

(54) SYSTEM AND METHOD TO CONTROL CROP LOSS IN A WINDROWER IMPLEMENT

(71) Applicant: Deere & Company, Moline, IL (US)

(72) Inventors: Mahesh Somarowthu, Pune (IN); Mahi Agrawal, Pune (IN)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 18/464,346

(22) Filed: Sep. 11, 2023

(65) Prior Publication Data

US 2025/0081893 A1     Mar. 13, 2025

(51) Int. Cl.
| | |
|---|---|
| *A01D 57/26* | (2006.01) |
| *A01D 57/20* | (2006.01) |
| *G05D 7/06* | (2006.01) |

(52) U.S. Cl.
CPC ............. *A01D 57/26* (2013.01); *A01D 57/20* (2013.01); *G05D 7/0605* (2013.01)

(58) Field of Classification Search
CPC ....... A01D 57/26; A01D 57/20; G05D 7/0605
See application file for complete search history.

(56) References Cited

U.S. PATENT DOCUMENTS

| | | | |
|---|---|---|---|
| 2005/0141154 A1* | 6/2005 | Consadori ............. | B60R 16/023 |
| | | | 361/62 |
| 2006/0123764 A1* | 6/2006 | McLean ................. | A01D 43/04 |
| | | | 56/350 |
| 2020/0008350 A1* | 1/2020 | Borsdorf ................ | A01D 61/02 |
| 2021/0185914 A1* | 6/2021 | Stephens ................ | A01D 61/00 |
| 2023/0048708 A1 | 2/2023 | Vadnere et al. | |
| 2023/0049727 A1* | 2/2023 | Hamilton ............. | A01D 43/085 |
| 2023/0200298 A1* | 6/2023 | Isaac ................... | A01D 41/1243 |
| | | | 460/101 |
| 2023/0345878 A1* | 11/2023 | Hamilton ............... | A01D 57/26 |
| 2023/0359195 A1* | 11/2023 | Lapp .................... | G05D 1/0022 |

* cited by examiner

*Primary Examiner* — Nicole Coy
*Assistant Examiner* — Jennifer A Railey
(74) *Attorney, Agent, or Firm* — Lucian Wayne Beavers; Summer Basham Todd; Patterson Intellectual Property Law, PC

(57) ABSTRACT

A windrower implement includes a merger attachment coupled to a frame rearward of an implement head. The merger attachment includes a conveyor positioned relative to the implement head to receive discharged crop material from the implement head and convey the crop material laterally relative to the central longitudinal axis to form a windrow laterally offset from the central longitudinal axis. A forming shield guides the crop material from the implement head to the merger attachment. A crop inflow sensor detects crop inflow rate through the implement head. A crop outflow sensor detects crop outflow rate on the conveyor of the merger attachment. A controller receives and compares signals from the sensors to detect crop material loss.

20 Claims, 5 Drawing Sheets

SYSTEM AND METHOD TO CONTROL CROP LOSS IN A WINDROWER IMPLEMENT

TECHNICAL FIELD

The disclosure generally relates to a windrower implement having a merger attachment, and a method of monitoring and controlling the merger attachment to detect and control crop loss.

BACKGROUND

A windrower implement is an agricultural machine that cuts standing crop material while moving through a field, and forms the cut crop material into a swath or windrow. Typically, the windrower implement forms the windrow on and along a general longitudinal centerline of the windrower implement, generally between the left and right ground engaging devices, e.g., tires or tracks. The windrower implement may be equipped with a merger attachment. The merger attachment is configured to form the windrow laterally offset from the centerline of the windrower implement, generally outside the left or right ground engaging devices. The merger attachment may be deployed to form the windrow at an offset position relative to the centerline of the windrower implement, or may be stowed and disengaged, whereby the windrow is formed generally along the centerline of the windrower implement.

When harvesting crop material from a field, the windrower implement typically makes several parallel passes through the field with each pass cutting a width of the crop material. An operator of the windrower implement may control the windrower implement to execute a single pass windrow configuration in which the operator keeps the merger attachment continuously disengaged for each respective pass such that each respective pass through the field generates a respective windrow aligned with the longitudinal centerline of the windrower implement during that respective pass. The operator may alternatively control the windrower implement to execute a double pass windrow configuration in which the operator disengages the merger attachment while executing a belly pass, whereby the windrow is formed along the centerline of the windrower implement. After completing the belly pass, the operator aligns the windrower implement immediately adjacent to the belly pass with the merger attachment deployed to execute a first merger pass. While executing the first merger pass, the merger attachment deposits the crop material from the first merger pass on or next to the windrow formed from the belly pass, thereby placing the windrow from two adjacent passes through the field together as a single windrow.

One problem encountered with the use of a merger attachment is the loss of crop material as the material flows through the windrower implement. This loss of crop material may be in the form of crop material falling onto the ground between an implement head and the merger attachment. Crop material may also be lost in the form of crop material becoming stuck at various locations within the windrower implement which may tend to clog the windrower implement.

Previously such crop loss has been managed by the operator of the windrower implement visually observing the crop loss and manually adjusting a forming shield on the windrower implement.

There is a need for improved systems for controlling such a windrower implement to aid the operator in monitoring and controlling crop loss.

SUMMARY

A windrower implement is provided. The windrower implement includes a frame extending along a central longitudinal axis between a forward end and a rearward end relative to a direction of travel during operation. An implement head is attached to the frame proximate the forward end thereof. The implement head is operable to cut standing crop material and discharge cut crop material in a rearward direction along the central longitudinal axis. A merger attachment is coupled to the frame rearward of the implement head. The merger attachment includes a merger conveyor configured to receive discharged crop material from the implement head and to convey the discharged cop material laterally relative to the central longitudinal axis to form a windrow laterally offset from the central longitudinal axis. A forming shield is configured to guide the discharged crop material from the implement head, the forming shield including left and right shield walls adjustable in position to adjust a gap between the left and right shield walls, and the forming shield including at least one forming shield actuator configured to adjust a position of at least one of the left and right shield walls to adjust the gap. A crop inflow sensor is configured to detect one or more parameters corresponding to a crop inflow rate through the implement head and to generate a crop inflow sensor signal. A crop outflow sensor is configured to detect one or more parameters corresponding to a crop outflow rate from the merger conveyor and to generate a crop outflow sensor signal. A controller is configured to receive the crop inflow sensor signal and the crop outflow sensor signal, compare the crop inflow rate and the crop outflow rate to detect a crop loss, and generate an output signal corresponding to the detected crop loss.

In another embodiment a method is provided of operating a windrower implement, the windrower implement including a frame extending along a central longitudinal axis between a forward end and a rearward end relative to a direction of travel during operation, an implement head supported from the frame, a merger attachment including a merger conveyor supported from the frame rearward of the implement head, and a forming shield including left and right shield walls and at least one forming shield actuator configured to adjust a position of at least one of the left and right shield walls. The method includes:

cutting standing crop material with the implement head and discharging cut crop material from the implement head in a rearward direction along the central longitudinal axis;

guiding the discharged crop material from the implement head with the forming shield;

receiving the discharged crop material on the merger conveyor from the implement head and conveying the discharged crop material laterally relative to the central longitudinal axis to form a windrow laterally offset from the central longitudinal axis;

detecting with a crop inflow sensor one or more parameters corresponding to a crop inflow rate through the implement head and generating a crop inflow sensor signal;

detecting with a crop outflow sensor one or more parameters corresponding to a crop outflow rate from the merger conveyor and generating a crop outflow sensor signal; and receiving the crop inflow sensor signal and the crop outflow sensor signal in a controller, comparing the crop inflow rate and the crop outflow rate with the controller and thereby detecting a crop loss, and generating an output signal with the controller corresponding to the detected crop loss.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
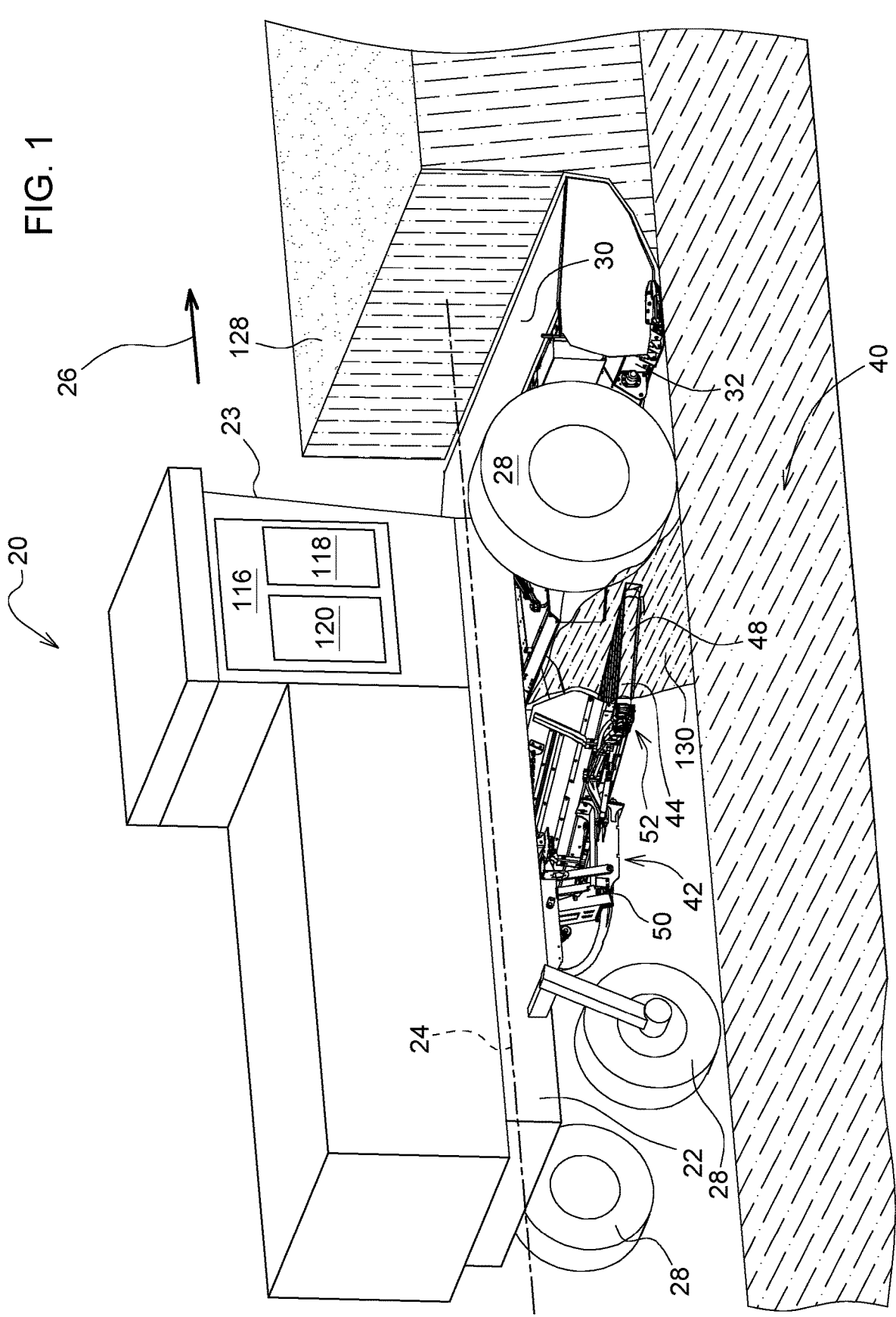
FIG. 1 is a schematic perspective view of a windrower implement.

Referring to the Figures, wherein like numerals indicate like parts throughout the several views, a windrower implement is generally shown at 20 in FIG. 1. The exemplary embodiment of the windrower implement 20 shown in the Figures is configured as a self-propelled windrower. However, it should be appreciated that the teachings of this disclosure may be applied to other platforms, such as but not limited to, a drawn implement configured for connection to a tractor. In one implementation, the windrower implement 20 is operable to mow and collect standing crop material 128 in a field, condition the cut crop material as it moves through the windrower implement 20 to improve is drying characteristics, and then return the conditioned, cut crop material to the field in a windrow 40 or swath.

Figure 2:
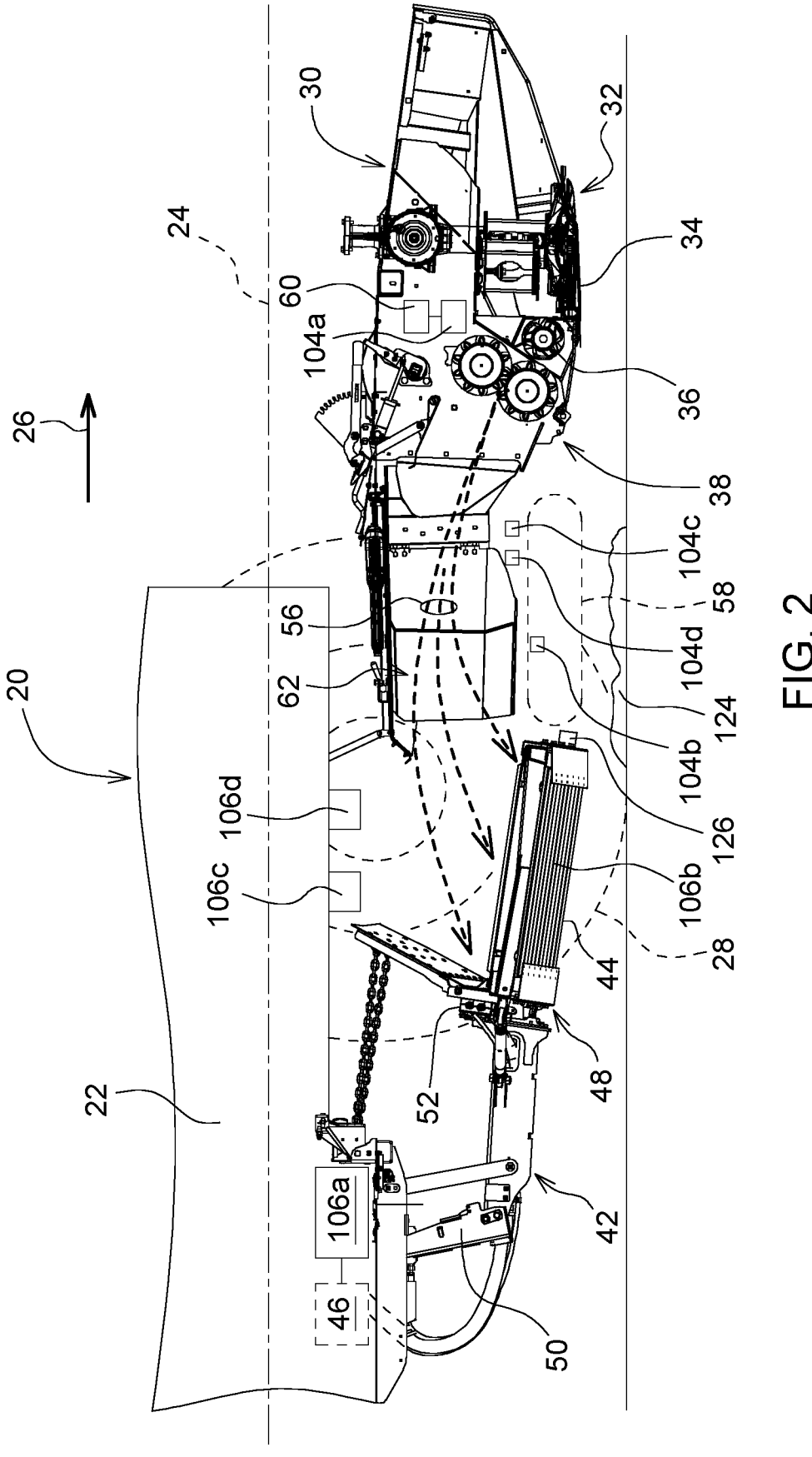
FIG. 2 is a cross sectional view of the windrower implement.

Referring to FIGS. 1-2, the example implementation of the windrower implement 20 includes a frame 22. The frame 22 extends along a central longitudinal axis 24 between a forward end and a rearward end relative to a direction of travel 26 during operation. An operator's station 23 may be located on the frame 22. The central longitudinal axis 24 defines a longitudinal centerline of the windrower implement 20. The frame 22 may include, but is not limited to, the various members, panels, supports, braces, beams, etc., necessary to support the various components and systems of the windrower implement 20 as described below. The windrower implement 20 includes ground engaging devices 28, e.g., tires and/or tracks, which support the frame 22 relative to a ground surface. The ground engaging devices 28 may be powered to move the windrower implement 20 across the ground surface.

The windrower implement 20 further includes an implement head 30. The implement head 30 is attached to the frame 22 proximate the forward end of the frame 22. The implement head 30 is operable to discharge crop material in a rearward direction generally along the central longitudinal axis 24. In addition, the implement head 30 may further cut the crop material and condition the crop material to aid in dry down.

In one implementation, the implement head 30 may include, but is not limited to, a cutting mechanism 32. The cutting mechanism 32 is coupled to the frame 22 and is operable to cut standing crop material 128 in a field. The cutting mechanism 32 may include any mechanism that is capable of cutting the crop material. For example, the cutting mechanism 32 may be embodied as a rotary disc cutter bar 34. However, the cutting mechanism 32 is not limited to the exemplary embodiment of the rotary disc cutter bar 34. As such, it should be appreciated that the cutting mechanism 32 may vary from the exemplary embodiment noted herein.

As understood in the art, the rotary disc cutter is supported by the frame 22. The cutter bar 34 extends along an axis that is disposed generally transverse to the direction of travel 26 of the windrower implement 20. The cutter bar 34 includes a plurality of cutting discs spaced along the cutter bar 34 for rotation about respective vertical axes. Each of the cutting discs is coupled to a drivetrain to which power is coupled for causing them to rotate in appropriate directions, for delivering cut crop material to an auger 36 disposed rearward of the cutting mechanism 32.

The auger 36 may pass the crop material rearward to a crop conditioning system 38. In particular, the auger 36 may be positioned in front of and lower than the crop conditioning system 38. In operation, the design of the auger 36 enables the delivery of cut crop material into the crop conditioning system 38. The cutting mechanism 32 delivers cut crop material to the auger 36, which in turn may delivers the cut crop material rearward for further processing by the crop conditioning system 38. The crop conditioning system 38 may include, but is not limited to, an impeller style conditioning system or a pair of counter rotating conditioner rolls, as is understood in the art. The conditioned crop material is expelled rearward by the crop conditioning system 38, and may be formed into the windrow 40 or swath by a forming shield 62 further described below. The cut and conditioned crop material is expelled or discharged from the crop conditioning system 38 in the rearward direction, whereafter the crop material moves a short distance through the air, such as along path 56 seen in FIG. 2, before accumulating on the ground in the formed windrow 40.

Referring to FIGS. 1-2, the windrower implement 20 includes a merger attachment 42. The merger attachment 42 is coupled to the frame 22 rearward of the implement head 30. The merger attachment 42 includes a merger conveyor 44 that is moveable between a deployed position and a stowed position. When the merger conveyor 44 is disposed in the deployed position as seen in FIGS. 1 and 2, the merger conveyor 44 is positioned relative to the implement head 30 to receive discharged crop material from the implement head 30 and convey the crop material laterally relative to the central longitudinal axis 24 to form the windrow 40 laterally offset from the central longitudinal axis 24. When the merger conveyor 44 is disposed in the stowed position (not shown), the merger conveyor 44 is positioned relative to the implement head 30 to not receive discharged crop material from the implement head 30 to form the windrow 40 substantially aligned with the central longitudinal axis 24 along the centerline of the windrower implement 20.

The merger conveyor 44 of the merger attachment 42 may be positioned as seen in FIGS. 1 and 2 such that the crop material discharged from the crop conditioning system 38 falls on the merger conveyor 44 instead of the ground. The crop material discharged from the crop conditioning system 38 is disposed generally along a longitudinal centerline of the windrower implement 20, between left and right ground engaging devices 28 of the windrower implement 20.

The crop conditioning system 38 may be configured such that crop material discharged from the crop conditioning system 38 flies through an arc shape path 56 such as generally indicated by the dash line paths 56 shown in FIG. 2. Additionally, or optionally the windrower implement 20 may include an implement head discharge conveyor 58, schematically shown in dashed lines in FIG. 2, configured to carry the material discharged from the crop conditioning system 38 to the merger conveyor 44.

The implement head 30 may include one or more implement head drive actuators 60 configured to drive crop material through the implement head 30. The implement head drive actuator 60 is schematically represented in FIG. 2. In one embodiment the implement head drive actuator 60 may drive the cutter bar 34. In another embodiment the implement head drive actuator 60 may drive the auger 36. In another embodiment the implement head drive actuator 60 may drive the crop conditioning system 38. In another embodiment the implement head drive actuator 60 may drive the implement head discharge conveyor 58.

The merger conveyor 44 is rotatably driven by a merger conveyor drive actuator 46, such as but not limited to an electric or hydraulic motor, and may include, for example, a rotatable endless belt, which is operable to convey the crop material laterally relative to the longitudinal centerline of the windrower implement 20, and deposit the crop material on the ground at a laterally offset position relative to the central longitudinal axis 24 of the frame 22 and the centerline of the windrower implement 20. The crop material is discharged from the implement head 30 and falls onto the merger conveyor 44 of the merger attachment 42. The merger conveyor 44 moves or rotates to move the crop disposed thereon laterally outward away from the centerline of the windrower implement 20. The crop on the merger conveyor 44 is deposited or discharged off a distal end 48 of the merger conveyor 44, whereafter the crop falls to the ground forming the windrow 40 which is laterally offset from centerline of the windrower implement 20.

The merger attachment 42 may include a lift structure 50 and a support structure 52. The support structure 52 includes the merger conveyor 44 for moving the crop material. The lift structure 50 may interconnect the frame 22 of the windrower implement 20 and the support structure 52. The lift structure 50 may be configured to selectively position the support structure 52 and the merger conveyor 44 thereof in the stowed position and the deployed position. When disposed in the stowed position, the lift structure 50 may position the support structure 52 tightly against the belly of the frame 22, such that the merger conveyor 44 of the support structure 52 does not engage the cut crop material discharged from the implement head 30 and the windrow 40 may be formed along the central longitudinal axis 24 of the frame 22, i.e., generally along the centerline of the windrower implement 20. When disposed in the deployed position a seen in FIGS. 1 and 2, the lift structure 50 may position the merger conveyor 44 of the support structure 52 near the ground surface, such that the crop material discharged from the implement head 30 falls on the merger conveyor 44 of the support structure 52 for lateral movement relative to the central longitudinal axis 24, whereby the windrow 40 may be formed laterally offset form the central longitudinal axis 24. The features, components, structure, and operation of the lift structure 50 and the support structure 52 are understood by those skilled in the art, are not pertinent to the teachings of this disclosure, and are therefore not described in detail herein.

Figure 3:
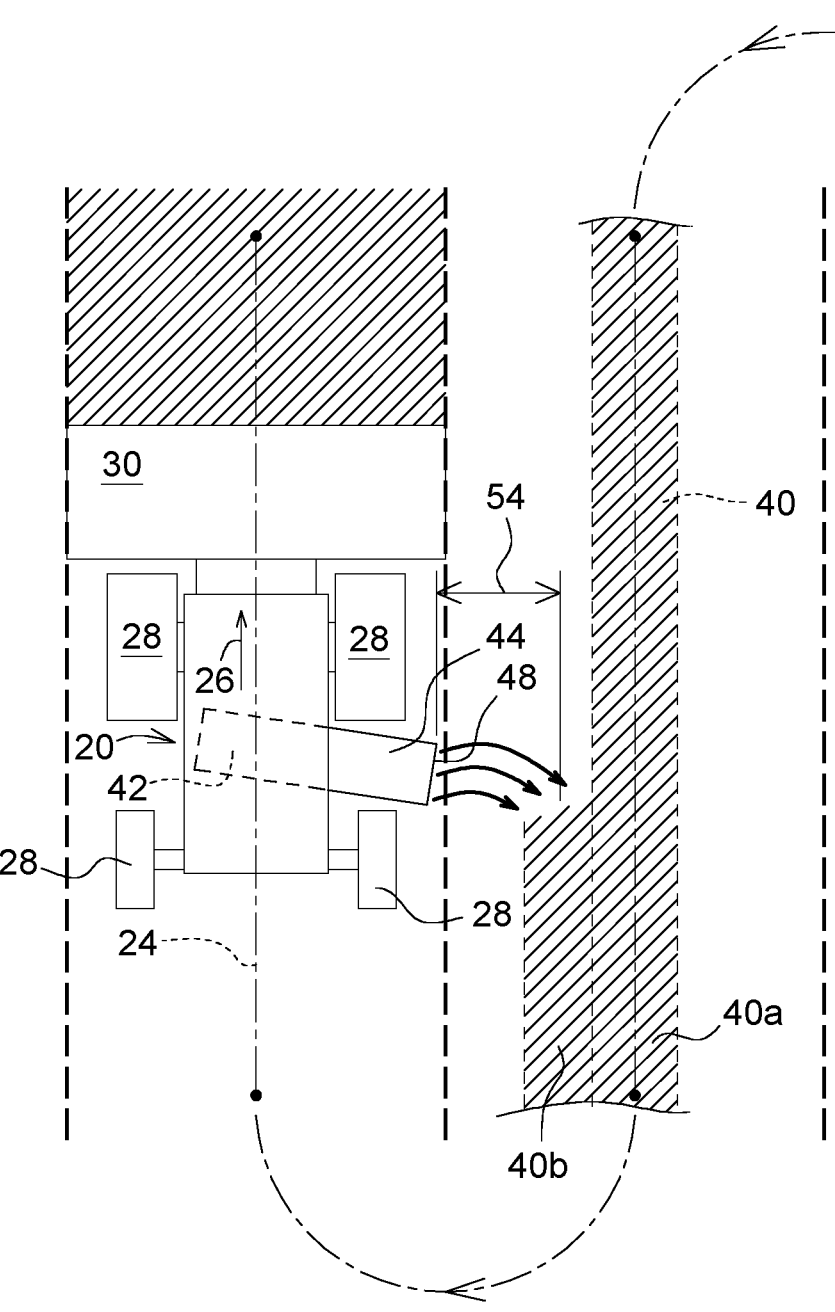
FIG. 3 is a schematic plan view of the windrower implement executing a double pass windrow operation in a field.

FIG. 3 is a schematic plan view of the windrower implement 20 beginning a merger pass adjacent a previous belly pass. The merger attachment 30 throws the crop material off of the merger conveyor 44 a throw distance 54 such that the merger pass windrow 40b lies adjacent to the belly pass windrow 40a.

Figure 4:
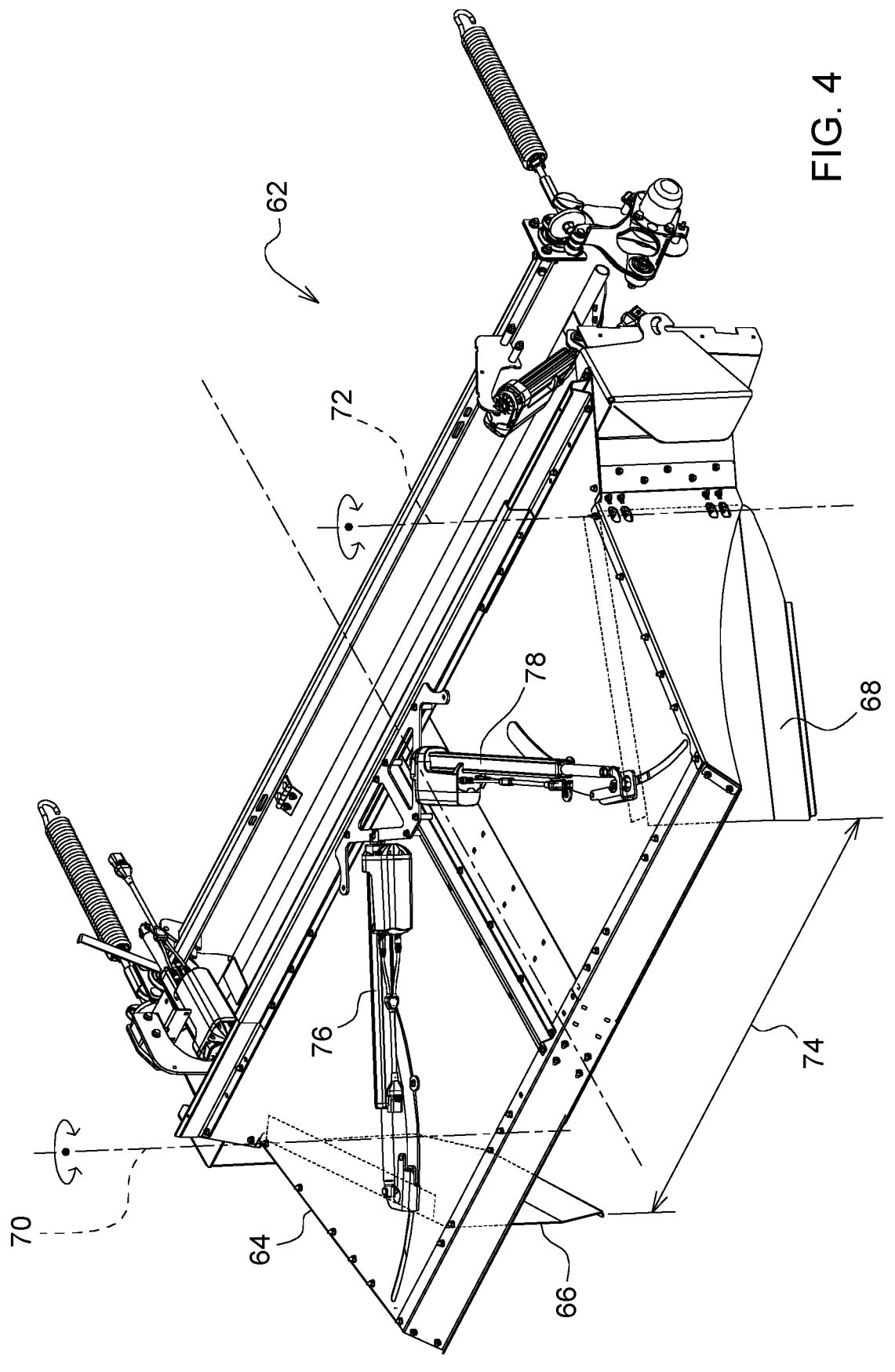
FIG. 4 is a schematic perspective view of the forming shield of the windrower implement.

The windrower implement 20 further includes a forming shield 62 supported from the rear end of the implement head 30 and configured to guide the discharged crop material moving along path 56 from the implement head 30 to the merger conveyor 44. A detailed perspective view of an embodiment of the merger shield 62 is shown in FIG. 4.

The forming shield 62 includes a forming shield frame or housing 64 which supports various components. Left and right shield walls 66 and 68 are pivotally mounted on the housing 64 so as to be pivotally adjustable in position about vertical pivot axes 70 and 72, respectively to adjust a gap 74 between the left and right shield walls 66 and 68. The forming shield includes at least one forming shield actuator 76, 78 configured to adjust the position of at least one of the left and right shield walls to adjust the gap 74. As shown in FIG. 4 there may be a left shield wall actuator 76 and a right shield wall actuator 78. In another embodiment (not shown) a single shield wall actuator could simultaneously adjust the position of both the left and right shield walls. The shield wall actuators 76, 78 are shown as electrically powered linear actuators. Optionally the shield wall actuators 76, 78 could be rotary actuators located at the pivot axes 70, 72. Optionally the shield wall actuators 76, 78 could be hydraulically or pneumatically powered. It will be appreciated that by adjusting the gap 74 the stream of crop material moving along path 56 is shaped and the trajectory of the path 56 may also be affected.

Figure 5:
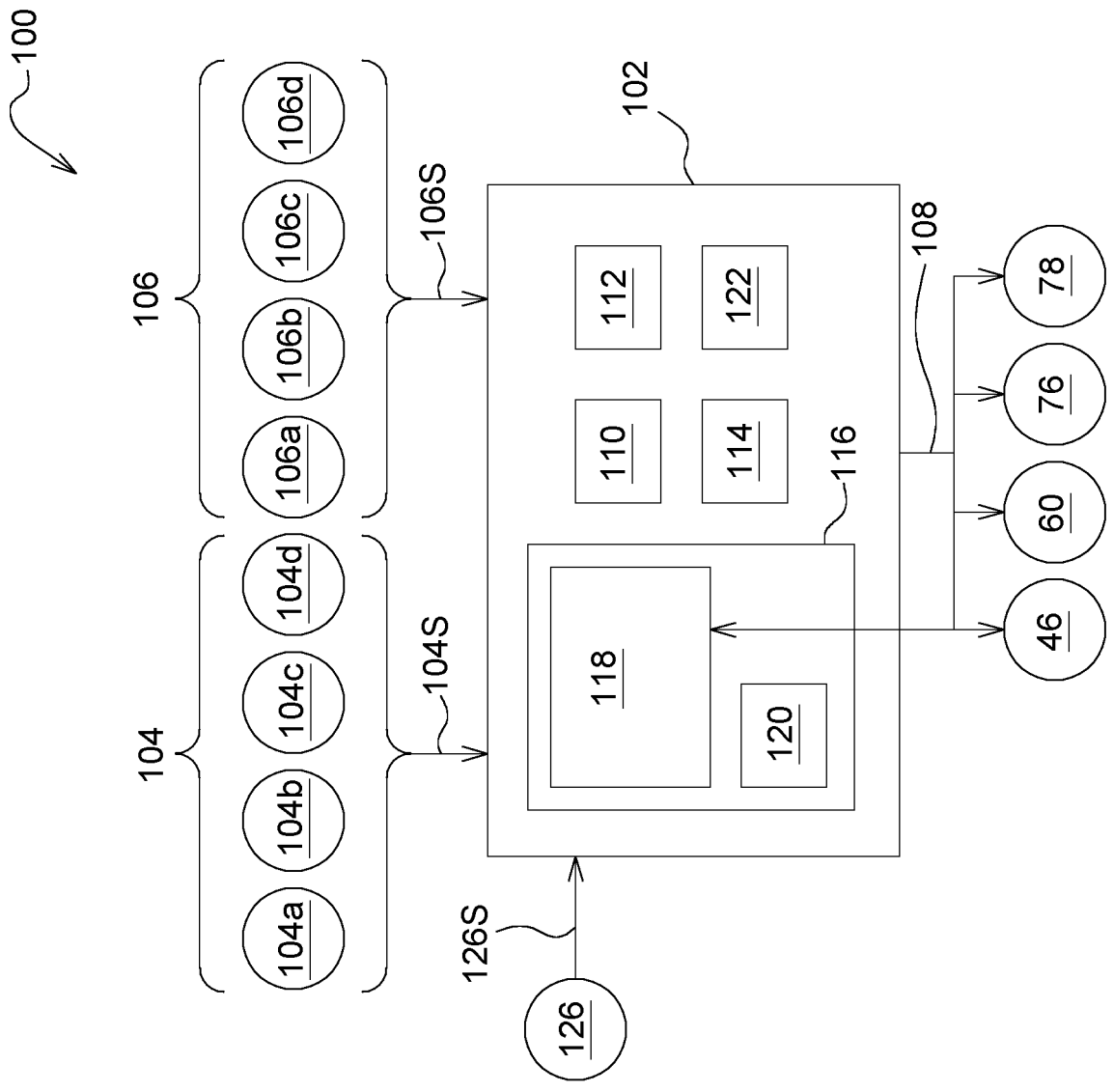
FIG. 5 is a schematic drawing of a control system of the windrower implement.

The Control System:

As schematically illustrated in FIG. 5, the windrower implement 20 includes a control system 100 including a controller 102. The controller 102 may be part of the machine control system of the windrower implement 20, or it may be a separate control module. The controller 102 may for example be mounted in a control panel 116 located at the operator's station 23. Controller 102 is configured to receive input signals from various sensors. The signals transmitted from the various sensors to the controller 102 are schematically indicated in FIG. 5 by lines connecting the sensors to the controller with an arrowhead indicating the flow of the signal from the sensor to the controller 102.

The windrower implement 20 may include at least one crop inflow sensor 104 configured to detect one or more parameters corresponding to a crop inflow rate through the implement head 30 and to generate a crop inflow sensor signal 104S which is directed to the controller 102. The windrower implement 20 may further include at least one crop outflow sensor 106 configured to detect one or more parameters corresponding to a crop outflow rate from the merger conveyor 44 and to generate a crop outflow sensor signal 106S which is directed to the controller 102. As further described below, the controller 102 may be configured to receive the crop inflow signal 104S and the crop outflow signal 106S, compare the crop inflow rate and the crop outflow rate to detect a crop loss, and generate an output signal 108 corresponding to the detected crop loss.

In one embodiment at least one of the crop inflow sensor 104 and the crop outflow sensor 106 may include a power load sensor 104a or 106a configured to detect a power load provided to the implement head drive actuator 60 or the merger conveyor drive actuator 46, respectively.

For example, if the implement head drive actuator 60 or the merger conveyor drive actuator 46 is a hydraulic actuator the crop inflow sensor 104a or the crop outflow sensor 106a may be in the form of a hydraulic pressure sensor sensing a hydraulic pressure provided to the respective hydraulic actuator. The hydraulic pressure may be correlated with the mass flow rate of crop material being moved by the respective hydraulic actuator.

In another example if the implement head drive actuator 60 or the merger conveyor drive actuator 46 is an electric actuator the crop inflow sensor 104a or the crop outflow sensor 106a may be in the form of an electrical load sensor sensing an electrical load provided to the respective electric actuator. The electrical load drawn by the electric actuator may be correlated with the mass flow rate of crop material being moved by the respective electric actuator.

In another embodiment at least one of the crop inflow sensor 104 and the crop outflow sensor 106 may include a weight sensor configured to detect a weight of crop flow through the implement head 30 or on the merger conveyor 44. For example, the implement head discharge conveyor 58 may have associated therewith a crop inflow sensor 104b in the form of a weight sensor arranged to detect a weight of the crop material carried by the implement head discharge conveyor 58. And the merger conveyor 44 may have associated therewith a crop outflow sensor 106b in the form of a weight sensor arranged to detect a weight of the crop material carried by the merger conveyor 44.

In another embodiment at least one of the crop inflow sensor 104 and the crop outflow sensor 106 may include a volumetric sensor and a density sensor.

For example, the crop inflow sensor 104 may include a volumetric sensor 104c and a density sensor 104d. The volumetric sensor 104c may for example be an optical sensor detecting a height and a width of a stream of crop material carried by the implement head discharge conveyor 58 and detecting a speed of the material flow. Based on the height, width and speed of the material flow a volumetric flow rate may be determined. Other types of volumetric sensors could be used. The density sensor 104d may be an ultrawideband radar sensor detecting a density of the stream of crop material carried by the implement head discharge conveyor 58. Other types of density sensors could be used. Based on the detected density and the detected volumetric flow rate, a mass flow rate for the crop inflow may be determined.

Similarly, the crop outflow sensor 106 may include a volumetric sensor 106c and a density sensor 106d. The volumetric sensor 106c may for example be an optical sensor detecting a height and a width of a stream of crop material carried by the merger conveyor 44 and detecting a speed of the material flow. Based on the height, width and speed of the material flow a volumetric flow rate may be determined. The density sensor 106d may be an ultrawideband radar sensor detecting a density of the stream of crop material carried by the merger conveyor 44. Based on the detected density and the detected volumetric flow rate, a mass flow rate for the crop outflow may be determined.

It should be appreciated that the flow sensors 104 and 106 may include any device or combination of devices that are capable of sensing the mass flow rate of the crop material and/or data related to the mass flow rate that enables the controller 102 to then calculate or estimate the mass flow rate. Accordingly, it should be appreciated that the flow sensors 104 and 106 may include a device or combination of devices not described herein.

Similarly, the controller 102 will generate control signals for controlling the operation of various actuators of the windrowing implement 20. Those actuators may for example be associated with various subsystems of the grain harvesting machine which affect the grain loss within the machine. Those actuators may include for example, the merger conveyor drive actuator 46, the implement head drive actuator 60, and the left and right shield wall actuators 76 and 78, just to name a few.

Controller 102 includes or may be associated with a processor 110, a computer readable medium 112, a data base 114 and an input/output module or control panel 116 having a display 118. An input/output device 120, such as a keyboard, joystick or other user interface, is provided so that the human operator may input instructions to the controller. The input/output device 120 may also be referred to as an operator input device 120. It is understood that the controller 102 described herein may be a single controller having all of the described functionality, or it may include multiple controllers wherein the described functionality is distributed among the multiple controllers.

Various operations, steps or algorithms as described in connection with the controller 102 can be embodied directly in hardware, in a computer program product 122 such as a software module executed by the processor 110, or in a combination of the two. The computer program product 122 can reside in RAM memory, flash memory, ROM memory, EPROM memory, EEPROM memory, registers, hard disk, a removable disk, or any other form of computer-readable medium 112 known in the art. An exemplary computer-readable medium 112 can be coupled to the processor 110 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 112 and/or database 114 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

For example, the controller 102 may be configured via appropriate programming in the computer program product 122 to receive the crop inflow sensor signal 104S and the crop outflow sensor signal 106S and to compare the two signals to detect a crop loss. The controller 102 may be configured to determine a crop inflow rate and a crop outflow rate based on the crop inflow sensor signal 104S and the crop outflow sensor signal 106S, subtract the crop outflow rate from the crop inflow rate to obtain a difference, with the difference being a representation of a crop loss within the windrower implement 20.

The controller may be configured to compare that difference to a preset threshold value to determine whether the crop loss exceeds the present threshold value. The threshold value may be an absolute value or it may be determined as a percentage of the crop inflow rate or of the crop outflow rate. The controller 102 may be configured such that the operator of the windrower implement 20 may adjust the preset threshold value. Such adjustment may for example be made via an input to the input/output device 120.

The controller 102 may be configured to provide a visual and/or audible output representative of the detected crop loss to the operator of the windrower implement 20. The visual output may for example be an indicia displayed on the display 118. The visual output may be in the form of a warning light that changes from green to yellow to red indicating that crop loss is below, near or above the threshold, respectively. The audible output may also be provided in the area of the operator's station 23. The human operator may then make appropriate adjustments to the gap 74 of the forming shield 62, or make other machine adjustments such as adjusting an advance speed. This may be referred to as a manual mode of adjustment of the forming shield 62.

The controller 102 may be further configured to communicate to the operator of the windrower implement 20 a recommended adjustment of the forming shield 62 to bring the crop loss below the threshold. For example, the controller 102 may look up a proper setting for the gap 74 from a lookup table of historical performance data, based on crop flow rates, moisture content, crop density, and any other relevant factors. The controller 102 may display the recommended adjustment on the display 118 for the operator, who may then manually adjust the gap 74 by inputting instructions to the left and right shield wall actuators 76 and 78 via an input to the input/output device 120. This may be referred to as a semi-automated mode of adjustment of the forming shield 62.

The controller 102 may be further configured to send a command signal 108 to the forming shield actuators 76 and 78 to automatically adjust the gap 74 between the left and right shield walls 66 and 68 at least in part responsive to the crop inflow sensor signal 104S and the crop outflow sensor signal 106S to reduce the crop loss. For example, the controller 102 may look up a proper setting for the gap 74 from a lookup table of historical performance data, based on crop flow rates, moisture content, crop density, and any other relevant factors and the controller may command the forming shield actuators 76 and 78 to implement the desired gap 74. The controller 102 may also command adjustment of other relevant machine parameters such as the advance speed or the speed of the implement head drive actuator 60. This may be referred to as a fully automatic mode of adjustment of the forming shield 62.

The controller 102 may be further configured to identify the crop loss as crop falling onto a ground surface between the implement head 30 and the merger attachment 42. Such crop loss falling on the ground surface is schematically indicated in FIG. 2 as 124. Such crop loss may for example be identified through the use of a camera 126 arranged to view the area of interest. A camera output signal 126S may be received by the controller 102 and through appropriate image processing techniques a quantitative measure of the crop loss 124 onto the ground surface may be provided.

The controller 102 may be further configured to identify the crop loss, as being at least partially retained in the windrower implement 20. For example, the controller 102 may compare the total crop loss (determined by subtracting crop outflow rate from crop inflow rate) to the quantitative crop loss determined to be crop loss 124 on the ground surface. The controller 102 may be configured to identify the difference between the total crop loss and the crop loss 124 to the ground surface as being crop material that is retained within the windrower implement 20. For example, that retained crop material may over time be clogging the various components of the windrower implement 20, such as for example the auger 36 and crop conditioning system 38.

The controller 102 may be further configured to provide a visual and/or audible warning to the operator of the windrower implement 20 of a current or a predicted clogging of the windrower implement by the crop retained in the windrower implement 20. This warning may be displayed on the display 118. The audible warning may be provided in the vicinity of the operator's station 23.

Methods of Operation:

One method of operation of the windrower implement 20 described above may include:

cutting standing crop material 128 with the implement head 30 and discharging cut crop material from the implement head 30 in a rearward direction along the central longitudinal axis 24;

guiding the discharged crop material from the implement head 30 with the forming shield 62;

receiving the discharged crop material on the merger conveyor 44 from the implement head 30 and conveying the discharged crop material laterally relative to the central longitudinal axis 24 to form a windrow 40 laterally offset from the central longitudinal axis 24;

detecting with a crop inflow sensor 104 one or more parameters corresponding to a crop inflow rate through the implement head 30 and generating a crop inflow sensor signal 104S;

detecting with a crop outflow sensor 106 one or more parameters corresponding to a crop outflow rate from the merger conveyor 44 and generating a crop outflow sensor signal 106S; and receiving the crop inflow sensor signal 104S and the crop outflow sensor signal 106S in a controller 102, comparing the crop inflow rate and the crop outflow rate with the controller 102 and thereby detecting a crop loss, and generating an output signal 108 with the controller corresponding to the detected crop loss.

The method may further include providing a visual and/or audible output representation of the detected crop loss to the operator of the windrower implement 20 located in the operator's cabin 23.

The method may further include communicating to the operator of the windrower implement 20 a recommended adjustment of the forming shield, such as by displaying the recommended adjustment on the display 118.

The method may further include sending a command signal 108 from the controller 102 to the forming shield actuator 66, 68 and thereby adjusting the position of at least one of the left and right shield walls 66, 68 automatically at least in part in response to the crop inflow sensor signal 104S and the crop outflow sensor signal 106S.

The method may further include identifying the crop loss as crop 124 falling onto the ground surface between the implement head 30 and the merger attachment 42.

The method may further include identifying the crop loss as crop retained in the windrower implement 20 and providing a visual and/or audible warning to the operator of the windrower implement 30 of a current or a predicted clogging of the windrower implement by the crop retained in the windrower implement.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrower implement, comprising:

a frame extending along a central longitudinal axis between a forward end and a rearward end relative to a direction of travel during operation;

an implement head supported from the frame and operable to cut standing crop material and discharge cut crop material in a rearward direction along the central longitudinal axis;

a merger attachment supported from the frame rearward of the implement head, the merger attachment including a merger conveyor configured to receive discharged crop material from the implement head and to convey the discharged crop material laterally relative to the central longitudinal axis to form a windrow laterally offset from the central longitudinal axis;

a forming shield configured to guide the discharged crop material from the implement head, the forming shield including left and right shield walls adjustable in position to adjust a gap between the left and right shield walls, and the forming shield including at least one forming shield actuator configured to adjust a position of at least one of the left and right shield walls to adjust the gap;

a crop inflow sensor configured to detect one or more parameters corresponding to a crop inflow rate through the implement head and to generate a crop inflow sensor signal;

a crop outflow sensor configured to detect one or more parameters corresponding to a crop outflow rate from the merger conveyor and to generate a crop outflow sensor signal; and a controller configured to receive the crop inflow sensor signal and the crop outflow sensor signal, compare the crop inflow rate and the crop outflow rate to detect a crop loss, and generate an output signal corresponding to the detected crop loss.

2. The windrower implement set forth in claim 1, wherein the controller is further configured to provide a visual and/or audible output representation of the detected crop loss to an operator of the windrower implement.

3. The windrower implement set forth in claim 2, wherein the controller is further configured to communicate to the operator of the windrow implement a recommended adjustment of the gap between the left and right shield walls of the forming shield.

4. The windrower implement set forth in claim 2, wherein the controller is further configured to provide the visual and/or audible output representative of the detected crop loss to the operator of the windrower implement when the detected crop loss exceeds a preset threshold value.

5. The windrower implement set forth in claim 4, further comprising:

an operator interface operably associated with the controller, the operator interface including an operator input device configured such that the operator of the windrower implement can adjust the preset threshold value.

6. The windrower implement set forth in claim 1, wherein the controller is further configured to send a command signal to the forming shield actuator to adjust the gap between the left and right shield walls at least in part responsive to the crop inflow sensor signal and the crop outflow sensor signal to reduce the crop loss.

7. The windrower implement set forth in claim 1, wherein:

the implement head includes an implement head drive actuator configured to drive crop material through the implement head;

the merger conveyor includes a merger conveyor drive actuator configured to convey the crop material on the merger conveyor; and at least one of the crop inflow sensor and the crop outflow sensor includes a power load sensor configured to detect a power load provided to the implement head drive actuator or the merger conveyor drive actuator.

8. The windrower implement set forth in claim 1, wherein:

at least one of the crop inflow sensor and the crop outflow sensor includes a weight sensor configured to detect a weight of crop flow through the implement head or crop flow on the merger conveyor.

9. The windrower implement set forth in claim 1, wherein:

at least one of the crop inflow sensor and the crop outflow sensor includes a volumetric sensor and a density sensor, the volumetric sensor being configured to detect a volume of crop flow through the implement head or a volume of crop flow on the merger conveyor, and the density sensor being configured to detect a density of crop flow through the implement head or a density of crop flow on the merger conveyor.

10. The windrower implement set forth in claim 1, further comprising:

an operator interface operably associated with the controller, the operator interface including an operator input device configured such that an operator of the windrower implement can adjust the forming shield actuator with the operator input device.

11. The windrower implement set forth in claim 1, further comprising:

an operator interface operably associated with the controller, the operator interface including a display configured to display to an operator of the windrower implement a visual indicia representative of the crop loss.

12. The windrower implement set forth in claim 1, wherein the controller is further configured to identify the crop loss as crop falling onto a ground surface between the implement head and the merger attachment.

13. The windrower implement set forth in claim 1, wherein the controller is further configured to identify the crop loss as crop retained in the windrower implement.

14. The windrower implement set forth in claim 13, wherein the controller is further configured to provide a visual and/or audible warning to an operator of the windrower implement of a current or a predicted clogging of the windrower implement by the crop retained in the windrower implement.

15. A method of operating a windrower implement, the windrower implement including a frame extending along a central longitudinal axis between a forward end and a rearward end relative to a direction of travel during operation, an implement head supported from the frame, a merger attachment including a merger conveyor supported from the frame rearward of the implement head, and a forming shield including left and right shield walls and at least one forming shield actuator configured to adjust a position of at least one of the left and right shield walls, the method comprising:

cutting standing crop material with the implement head and discharging cut crop material from the implement head in a rearward direction along the central longitudinal axis;

guiding the discharged crop material from the implement head with the forming shield;

receiving the discharged crop material on the merger conveyor from the implement head and conveying the discharged crop material laterally relative to the central longitudinal axis to form a windrow laterally offset from the central longitudinal axis;

detecting with a crop inflow sensor one or more parameters corresponding to a crop inflow rate through the implement head and generating a crop inflow sensor signal;

detecting with a crop outflow sensor one or more parameters corresponding to a crop outflow rate from the merger conveyor and generating a crop outflow sensor signal; and receiving the crop inflow sensor signal and the crop outflow sensor signal in a controller, comparing the crop inflow rate and the crop outflow rate with the controller and thereby detecting a crop loss, and generating an output signal with the controller corresponding to the detected crop loss.

16. The method set forth in claim 15, further comprising:

providing a visual and/or audible output representation of the detected crop loss to an operator of the windrower implement.

17. The method set forth in claim 15, further comprising:

communicating to an operator of the windrower implement a recommended adjustment of the forming shield.

18. The method set forth in claim 15, further comprising:

sending a command signal from the controller to the forming shield actuator and thereby adjusting the position of at least one of the left and right shield walls automatically at least in part in response to the crop inflow sensor signal and the crop outflow sensor signal.

19. The method set forth in claim 15, further comprising:

identifying the crop loss as crop falling onto a ground surface between the implement head and the merger attachment.

20. The method set forth in claim 15, further comprising:

identifying the crop loss as crop retained in the windrower implement; and providing a visual and/or audible warning to an operator of the windrower implement of a current or a predicted clogging of the windrower implement by the crop retained in the windrower implement.

* * * * *